Aug. 6, 1940.  J. E. LAWTON  2,210,814
NAVIGATIONAL PROTRACTOR
Filed Nov. 16, 1939   3 Sheets-Sheet 1

Inventor
JOSEPH EDWIN LAWTON

Milans & Milans
Attorneys

Aug. 6, 1940.   J. E. LAWTON   2,210,814
NAVIGATIONAL PROTRACTOR
Filed Nov. 16, 1939   3 Sheets-Sheet 2

Inventor
JOSEPH EDWIN LAWTON
By Milans & Milans
Attorneys

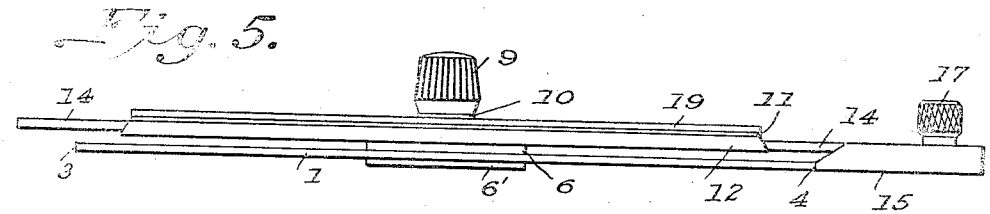
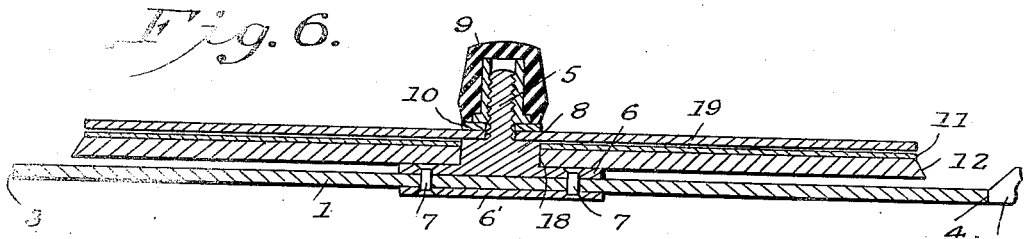
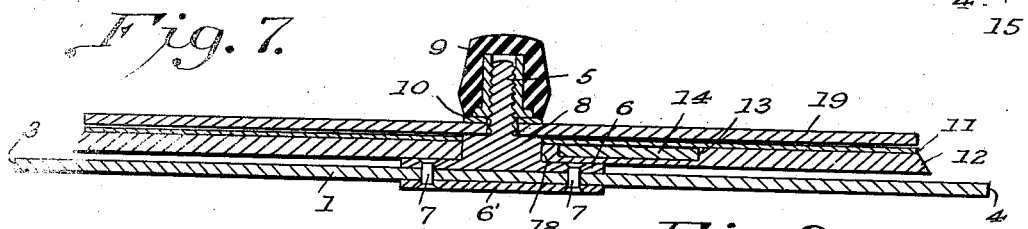
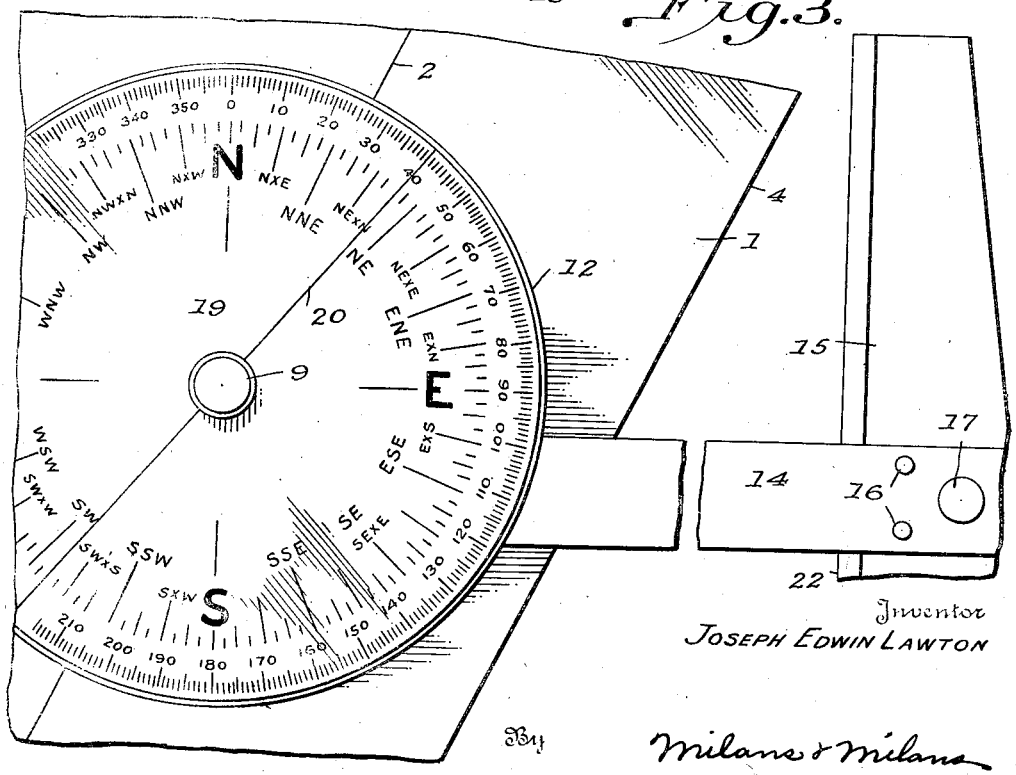

Patented Aug. 6, 1940

2,210,814

UNITED STATES PATENT OFFICE 2,210,814

NAVIGATIONAL PROTRACTOR

Joseph Edwin Lawton, Washington, D. C.

Application November 16, 1939, Serial No. 304,825

6 Claims. (Cl. 33—94)

My invention relates to new and useful improvements in navigational protractors or instruments for use in the navigation or piloting of vessels, motor boats, or sailing craft, and serves the same purpose in aerial navigation as in surface navigation.

The principal object of the invention resides in the provision of a device of the character described which is relatively simple and inexpensive in construction, sturdy and easy of adjustment, and when placed in position for use will not easily slip or otherwise produce inaccuracies in reading.

Another object of the invention consists in the provision of a navigational protractor or instrument which will give a direct reading of magnetic courses and at the same time, a reading of true courses, if desired.

A still further object of the invention resides in the provision of a device of the character described having a compass rose extremely easy to read because the rose disc, when the device is placed in position for use, reads in the same relative position to the directions on the chart as the printed rose on the chart without regard to the course angle being measured. The device may be used on uneven surfaces when a chart table is not available, and may be used satisfactorily under a very dim light.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 3 is a view similar to Fig. 2, parts broken away, showing the base swung relative to the compass rose in charting a course.

Fig. 5 is an end view.

Fig. 6 is a section on the line 6—6 of Fig. 2.

Fig. 7 is a section at right angles to that shown in Fig. 6 on the line 7—7 of Fig. 2.

Figure 1:
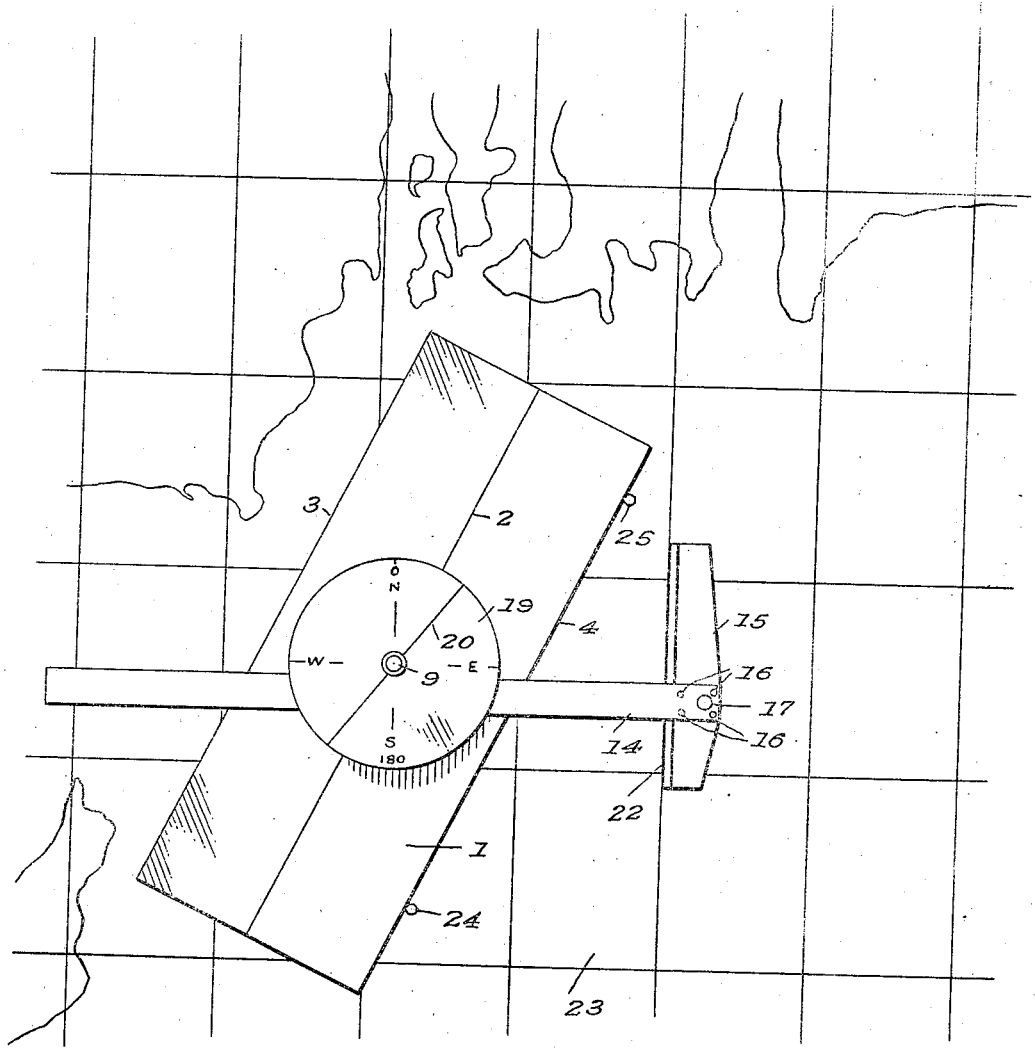
Fig. 1 is a plan showing my improved form of instrument or protractor in a position on a chart for charting a course.
Figure 8:
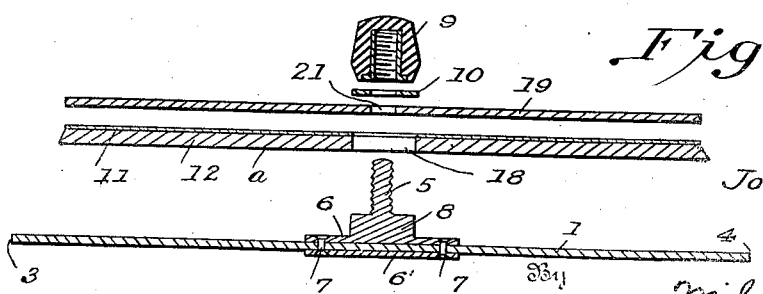
Fig. 8 is a sectional detail showing parts in separated positions before assembly.

My improved form of protractor or instrument is used in connection with charts or maps and at a single reading it will give the true and magnetic course angle expressed in either degrees or points for any direction between known places or positions. It can be used with equal facility to plot a line of position on a chart from one bearing of a known fixed object or a fix from two or more known fixed objects, whether they be objects visible by day, navigational lights or aids visible by night, or radio bearings. The instrument is provided with a means of readily and easily setting the angle of variation for any geographical position where being used. To determine a course angle it is then necessary only to place one long edge on the proposed course, to draw the straight edge of the T-square head to alignment with a meridian and read directly from the compass rose disc either the true direction as indicated on the central line on the base, or the magnetic direction as indicated by the single line on the transparent disc over the compass rose disc. For plotting a line of position or a position by bearings it is necessary only to intersect the object observed as marked on the chart with one edge or one corner of the base and with the straight edge of the T-square head aligned with a meridian, give the base card a circular or rotary movement until the observed direction or bearing falls exactly under the line on the magnetic indicator disc. If the observed bearing was first reduced to a true direction the plotting would be done in the same manner except that the bearing reading on the compass rose disc would be aligned with the central line on the base card.

With the above general description of my instrument and manner of use I will now give a detailed description of the construction thereof.

My protractor includes a rectangular base sheet 1, formed of transparent Celluloid or similar flexible transparent material, having a line 2 through its longitudinal axis parallel with the long sides 3 and 4 and equi-distant from each side. Centered on the axis line, and centrally in the rectangular base sheet, is secured a threaded post 5, this post having a base 6 which is secured to the base sheet 1 and plate 6' by means of rivets 7 or other suitable fastenings. The post 5 is enlarged, as shown at 8, to provide a bearing or bushing which forms a spindle bearing for the compass rose disc shown generally at a, the enlarged portion 8 being slightly longer or higher than the thickness of the compass rose disc a. A knurled nut 9 is adapted to be received on the threaded post 5 and at 10 I have illustrated a bearing washer for a purpose and use which will be later brought out.

The compass rose disc is of a diameter slightly less than the width of the base plate 1 and has a face 11 composed of an opaque material such as white Celluloid on which is printed in black, or in a color strongly contrasting with the field, a compass rose similar to those appearing on United States Coast and Geodetic charts having two circles of compass card calibrations, the outer circle next to the perimeter being divided into 360 parts with 0° at north, 90° at east, 180° at south and 270° at west, reading clockwise and the inner circle being divided into 128 divisions, the calibration showing the cardinal, inter-cardinal, intermediate points and by-points, each point being divided also into quarter points. This inner compass circle is imprinted so that north of 0° fall on the same radial line, east and 90°, south and 180°, and west and 270° corresponding likewise. The face card 11 is secured to the under disc 12, of a diameter similar to the face card 11, the under disc 12 being of molded plastic or built-up Celluloid or similar material.

Formed in the upper surface of the under disc 12 of the compass rose is a slot 13 at 90° to the north-south or 0°–180° line on the face disc 11, this slot being of a size to accommodate the blade or bar 14 of a T-square with a neat sliding fit, the head 15 of the T-square being secured to the end of the blade or bar by rivets 16 or other suitable fastenings. A knurled sleeve 17 is secured to the head 15 and forms a finger grip for manipulation of the T-square in a manner which will be later brought out. The slot 13 is offset from the center of the disc so that a central hole 18, in the disc, may be provided of correct size to neatly fit the enlarged part 8 of the base sheet post 5.

A magnetic direction indicator disc of transparent Celluloid or similar transparent material is shown at 19 and the diameter of this disc is approximately the same as the compass rose disc. The disc is bisected by a single narrow line 20 of black, orange or any color contrasting strongly with the color of the field of the compass rose, this line 20, when set for the angle of variation of the geographical place where the instrument is used, having for its object the reading of a magnetic direction expressed in either degrees or points. The disc 19 is provided with a hole 21 at its center, and centering on the single line, of a size to neatly fit the smaller threaded upper end of the base sheet post 5, and when placed in position on the base sheet post, fits solidly on the upper surface of the enlarged part 8, the disc then being close to the face of the compass rose disc a, but not interfering with the free and independent rotation of the compass rose disc therebeneath. When the nut 9 is screwed onto the post 5 it will press the magnetic direction indicator disc 19 against the upper surface of the enlargement 8 and firmly lock the magnetic indicator disc to the base sheet at any angle with the center line 2 on the base sheet 1 which will properly express the angle of magnetic variation at the place where the instrument is being used. It will be understood that the washer 10 will be positioned between the lower end of the nut 9 and the upper face of the compass rose disc a.

The arm or blade 14 of the T-square is of transparent Celluloid or similar material and in length is about the same as the length of the base sheet 1 and of a width and thickness to fit the slot 13 in the compass rose disc with a neat sliding fit. The width and thickness of the blade is such as not to easily flex when the base sheet is rotated. The head 15 of the T-square is of an opaque material similar to hard rubber, or molded plastic, or of transparent Celluloid or similar transparent material, the length of the head being about the same as the width of the base sheet. The side 22 of the T-square head next to the blade is a straight edge and when the blade and head are securely fastened together the straight edge of the head and the sides of the blade form an angle of 90°. If desired, both long edges of the T-square head 15 may be made straight and parallel to each other to facilitate the use of either side of the head in setting the instrument for reading.

In Fig. 1 of the drawings a portion of a chart is indicated at 23 and the points being charted are shown at 24 and 25.

Figure 2:
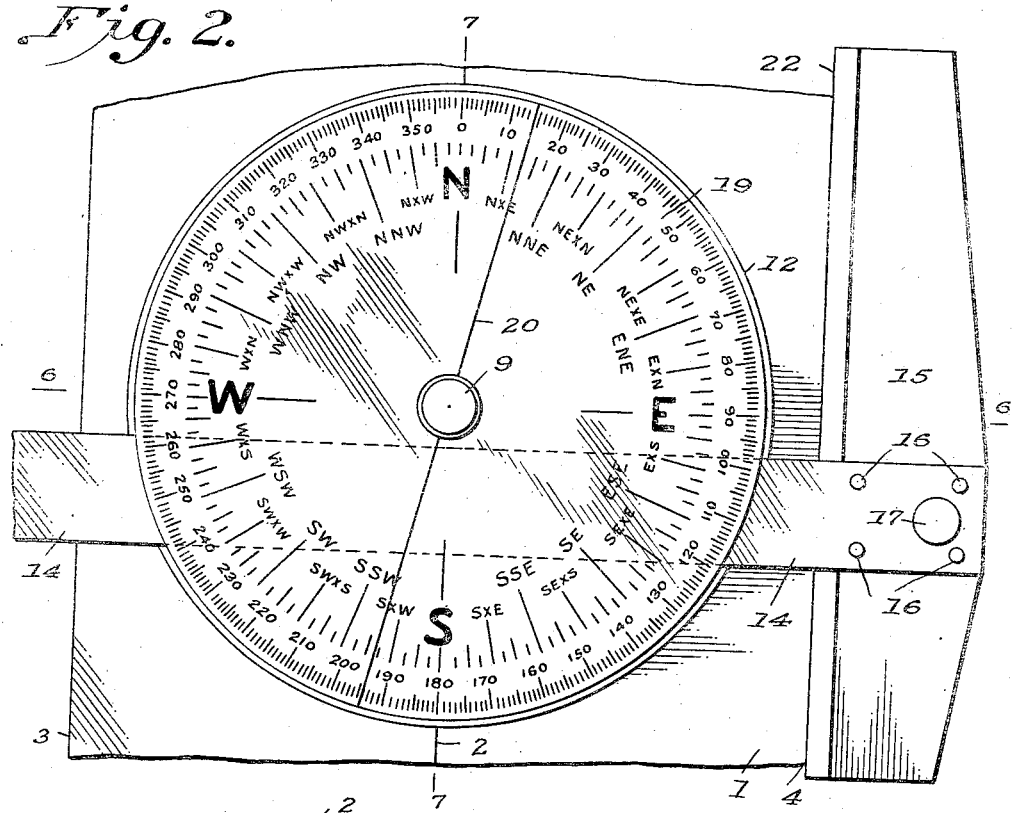
Fig. 2 is a fragmental enlarged plan showing a portion of the base, the compass rose, and T-square, the head of the T-square being parallel with an edge of the base.
Figure 4:
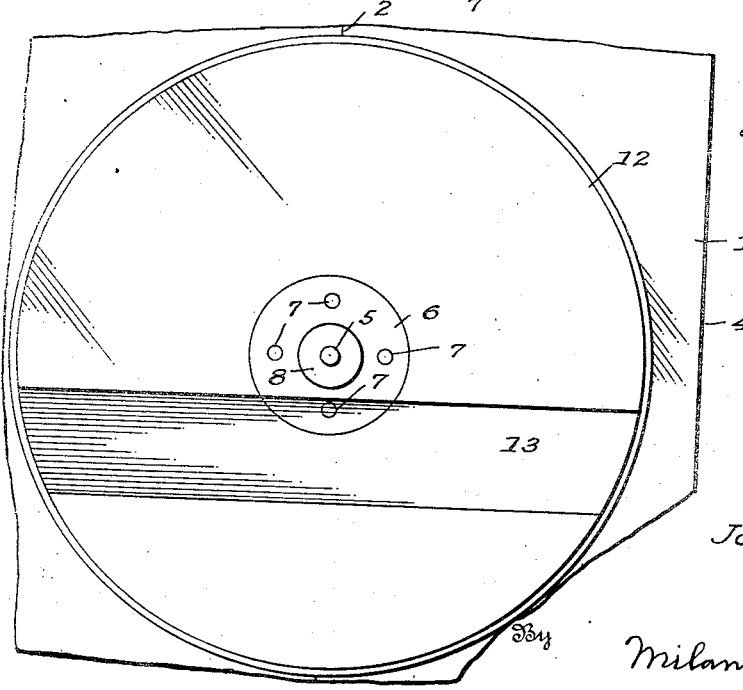
Fig. 4 is a fragmental plan of the base with a portion of the compass rose removed to show the recess for the T-square bar.

Having fully described the detailed construction I will now endeavor to more in detail set forth the manner in which the instrument is used. The user will first set the instrument for the angle of magnetic variation for the place in which the instrument is being used, this information being obtained by reference to information on variation usually appearing on the printed compass rose on charts or otherwise indicated. This is done by bringing the head 15 of the T-square against one side edge 4 of the base sheet, thus bringing the zero degree on the compass rose disc in line with the central line 2 of the base sheet. The nut 9 is then loosened so that the magnetic course indicator disc 19 may turn freely, and for westerly variation bringing the line 20 on top of the disc the approximate number of degrees of magnetic variation to the right or clockwise from 0° on the compass rose disc. Then the nut 9 will be tightened to lock this variation angle with relation to the base sheet (this is shown in Fig. 2). For an easterly magnetic variation, the line on the disc 19 will be moved to the left or anti-clockwise of 0° on the compass rose disc the number of degrees of magnetic variation, at the geographical place where the instrument is being used. In Figs. 1 and 2 of the drawings the magnetic disc 19 is shown moved in a clockwise direction with the line 20 in alignment with 14° on the compass rose disc. This shows the magnetic variation at the point where the plotting is taking place. Supposing that a course is to be plotted between the points 24 and 25, shown in Fig. 1 of the drawings. The edge 4, of the base sheet 1, will be placed so as to intersect the points 24 and 25 on the chart, the point 24 representing the point of departure while the point 25 denotes the point of arrival. Holding the base sheet 1 in this position the T-square is swung to bring the edge 22 in alignment with any convenient meridian or border line of the chart. Then the user will read the magnetic direction of the course from the line 20 on the magnetic disc 19 at the end appropriate for the direction of the vessel, or if the true direction is desired read the true course from the center line 2 of the base sheet 1. In Fig. 3 of the drawings the line 20, of the magnetic disc 19 is in alignment with 40° on the compass rose disc indicating the magnetic course by which the vessel should be steered. For plotting observed bearings, either edge on the base sheet 1 is placed in contact with the charted object observed, the T-square head is brought into alignment with a meridian and by a rotary and sliding movement of the base sheet the observed direction, expressed on the compass rose disc, is brought into coincidence with the magnetic indicator line on the magnetic indicator disc or the true indicator line on the base sheet, dependent upon whether the observed compass bearing was reduced to a magnetic direction or a true direction respectively. A line drawn on the chart against the edge of the base sheet will thus indicate a line of position. By using the suitable end of the direction indicator line, reversing an observed bearing is not necessary. Plotting radio beacon directions is accomplished in the same manner by placing the edge of the base sheet on the charted position of the source of radio waves. Plotting cross bearings, bow and beam bearings, or any other bearings are accomplished in the same manner as described above.

From the above it will be noted that I have provided a protractor or instrument of relatively simple construction by the use of which course angles may be easily and quickly obtained from any navigational chart for the piloting of a vessel or plane from a point of departure to a point of arrival. Further I wish to lay particular stress on the fact that the compass rose disc is always in the same relative position to the cardinal points on the chart and in use always remains in the same relative position thereby making the reading easy and rapid.

Having fully described my invention what I claim as new and desire to secure by Letters Patent is:

1. An instrument of the character described including a rectangular base sheet having a line through its long axis parallel with the side edges of the base sheet and equi-distant from each edge, a compass rose disc rotatably mounted on the base sheet and having graduations on a face thereof, the line through the longitudinal axis of the base sheet leading to the edge of the compass rose disc whereby the position of the line may be read with the graduations on the face of the compass rose disc, a magnetic direction indicator disc rotatably mounted on the base sheet and rotatable relative to the compass rose disc and base sheet and having a line bisecting the same, and means for holding the magnetic direction indicator disc in fixed relation to the base sheet while permitting rotation of the compass rose disc relative thereto.

2. An instrument of the character described including a rectangular base sheet having a line through its long axis parallel with the side edges of the base sheet and equi-distant from each edge, a compass rose disc rotatably mounted on the base sheet and having graduations on a face thereof, the line through the longitudinal axis of the base sheet leading to the edge of the compass rose disc whereby the position of the line may be read with the graduations on the face of the compass rose disc, a magnetic direction indicator disc rotatably mounted on the base sheet and rotatable relative to the compass rose disc and base sheet and having a line bisecting the same, means for holding the magnetic direction indicator disc in fixed relation to the base sheet while permitting rotation of the compass rose disc relative thereto, and a T-square carried by and slidably mounted relative to the compass rose disc.

3. An instrument of the character described including a rectangular base sheet having a line through its long axis parallel with the side edges of the base sheet and equi-distant from each edge, a compass rose disc having a recess formed in one face and rotatably mounted on the base sheet, the compass rose disc having graduations on a face thereof, the line through the longitudinal axis of the base sheet leading to the edge of the compass rose disc whereby the position of the line may be read with the graduations on the face of the compass rose disc, a magnetic direction indicator disc rotatably mounted on the base sheet and rotatable relative to the compass rose disc and base sheet and having a line bisecting the same, means for holding the magnetic direction indicator disc in fixed relation to the base sheet while permitting rotation of the compass rose disc relative thereto, and a T-square having a portion slidably mounted in the recess in the face of the compass rose disc.

4. An instrument of the character described including a rectangular base sheet having a line through its long axis parallel with the side edges of the base sheet and equi-distant from each edge, a post projecting upwardly from the base sheet and provided with an enlarged shoulder portion, a compass rose disc having an opening therein to receive the enlarged shoulder portion of the post, the compass rose disc being rotatable relative to the post and base sheet and having graduations on a face thereof, the line through the longitudinal axis of the base sheet leading to the edge of the compass rose disc whereby the position of the line may be read with the graduations on the face of the compass rose disc, a magnetic direction indicator disc supported on the enlarged shoulder portion of the post and rotatable relative to the compass rose disc and base sheet and having a line bisecting the same, and means for clamping the compass rose disc in tight engagement with the surface of the enlarged shoulder portion of the post to hold the magnetic direction indicator disc in fixed relation to the base sheet while permitting rotation of the compass rose disc relative thereto.

5. An instrument of the character described adapted to be used with a navigational chart, including a rectangular base sheet having a line through its long axis parallel with the side edges of the base sheet and equi-distant from each edge, said base sheet being adapted to have an edge portion or its center line intersecting a point of departure and a point of arrival on the chart, a compass rose disc rotatably mounted on the base sheet and having graduations on a face thereof, the line through the longitudinal axis of the base sheet leading to the edge of the compass rose disc whereby the position of the line may be read with the graduations on the face of the compass rose disc, a magnetic direction indicator disc rotatably mounted on the base sheet and rotatable relative to the compass rose disc and base sheet and having a line bisecting the same, means for holding the magnetic direction indicator disc in fixed relation to the base sheet while permitting rotation of the compass rose disc relative thereto, and a member carried by the compass rose disc and having a portion adapted to be aligned with a meridian line on the chart or an edge of the chart.

6. An instrument of the character described, adapted to be used with a navigational chart, including a rectangular base sheet having a line through its long axis parallel with the side edges of the base sheet and equi-distant from each edge, said base sheet being adapted to have an edge portion or its center line intersecting a point of departure and a point of arrival on the chart, a compass rose disc rotatably mounted on the base sheet and having graduations on a face thereof, the line through the longitudinal axis of the base sheet leading to the edge of the compass rose disc whereby the position of the line may be read with the graduations on the face of the compass rose disc, a magnetic direction indicator disc rotatably mounted on the base sheet and rotatable relative to the compass rose disc and base sheet and having a line bisecting the same, means for holding the magnetic direction indicator disc in fixed relation to the base sheet while permitting rotation of the compass rose disc relative thereto, and a T-square having a portion slidable relative to the compass rose disc and a portion adapted to be aligned with a meridian line on the chart or an edge of the chart.

JOSEPH EDWIN LAWTON.